United States Patent
Soukarie et al.

(10) Patent No.: US 11,984,035 B2
(45) Date of Patent: May 14, 2024

(54) DECISION ASSISTANCE DEVICE AND METHOD FOR MANAGING AERIAL CONFLICTS

(71) Applicant: THALES, Courbevoie (FR)

(72) Inventors: Rémy Soukarie, Rungis (FR); Andrei Purica, Rungis (FR); Dimitri Meunier, Rungis (FR); Béatrice Pesquet, Rungis (FR)

(73) Assignee: THALES, Courbevoie (FR)

( * ) Notice: Subject to any disclaimer, the term of this patent is extended or adjusted under 35 U.S.C. 154(b) by 251 days.

(21) Appl. No.: 17/778,851

(22) PCT Filed: Nov. 23, 2020

(86) PCT No.: PCT/EP2020/083049
§ 371 (c)(1),
(2) Date: May 22, 2022

(87) PCT Pub. No.: WO2021/105055
PCT Pub. Date: Jun. 3, 2021

(65) Prior Publication Data
US 2022/0415189 A1  Dec. 29, 2022

(30) Foreign Application Priority Data

Nov. 25, 2019  (FR) ...................... 1913153

(51) Int. Cl.
*G08G 5/00* (2006.01)
*G06N 3/084* (2023.01)
*G08G 5/04* (2006.01)

(52) U.S. Cl.
CPC .......... *G08G 5/0043* (2013.01); *G06N 3/084* (2013.01); *G08G 5/0026* (2013.01); *G08G 5/0039* (2013.01); *G08G 5/045* (2013.01)

(58) Field of Classification Search
CPC .. G08G 5/0043; G08G 5/0026; G08G 5/0039; G08G 5/045; G06N 3/084
See application file for complete search history.

(56) References Cited

U.S. PATENT DOCUMENTS

2013/0332059 A1  12/2013  Del Pozo de Poza
2018/0253979 A1   9/2018  Rey et al.

FOREIGN PATENT DOCUMENTS

WO  2019/122842 A1  6/2019
WO  WO-2022043648 A1 *  3/2022  ........... G08G 5/0013

OTHER PUBLICATIONS

Brittain, et al., "Autonomous Air Traffic Controller: A Deep Multi-Agent Reinforcement Learning Approach", arxiv.org, Cornell University, 2019.

* cited by examiner

*Primary Examiner* — Michael D Lang
(74) *Attorney, Agent, or Firm* — BakerHostetler

(57) ABSTRACT

A device for managing air traffic, in an airspace includes a reference aircraft and at least one other aircraft, the device receiving a three-dimensional representation of the airspace at a time when an air conflict is detected between the reference aircraft and the at least one other aircraft, the device comprising an airspace-encoding unit configured to determine a reduced-dimension representation of the airspace by applying a recurrent autoencoder to the three-dimensional representation of the airspace at the air-conflict detection time; a decision-assisting unit configured to determine a conflict-resolution action to be implemented by the reference aircraft, the decision-assisting unit implementing a deep-reinforcement-learning algorithm to determine the action on the basis of the reduced-dimension representation of the airspace, of information relating to the reference (Continued)

aircraft and/or the at least one other aircraft, and of a geometry corresponding to the air conflict.

10 Claims, 1 Drawing Sheet

DECISION ASSISTANCE DEVICE AND METHOD FOR MANAGING AERIAL CONFLICTS

CROSS-REFERENCE TO RELATED APPLICATIONS

This application is a National Stage of International patent application PCT/EP2020/083049, filed on Nov. 23, 2020, which claims priority to foreign French patent application No. FR 1913153, filed on Nov. 25, 2019, the disclosures of which are incorporated by reference in their entirety.

FIELD OF THE INVENTION

The invention relates generally to decision-assisting systems, and in particular to a decision-assisting system and method for managing air conflicts.

BACKGROUND

The development of decision-assisting systems has seen increasing growth in recent years and they have begun to be adopted in many industrial sectors, in particular in sectors in which safety is an issue, such as in the field of air-traffic control systems for example.

Air-traffic control systems must ensure the safety of air traffic. Air-traffic control systems are designed to guarantee safety distances between airplanes in the sectors assigned thereto, minimum safety distances between airplanes the paths of which will get close being maintained by modifying at least one of these paths. Known air-traffic control systems are equipped with air-traffic monitoring tools that in particular allow air conflicts to be detected, and/or provide decision assistance with a view to managing air conflicts.

There are two known approaches to managing air conflicts.

A first approach is based on using geometric computations to ensure continuous decision-making, this requiring powerful computing resources to be used intensively.

A second approach is based on the use of artificial-intelligence algorithms, these allowing air conflicts to be resolved while minimizing the resources required for computations.

For example, in the article "Reinforcement Learning for Two-Aircraft Conflict Resolution in the Presence of Uncertainty, Pham et al., Air Traffic Management Research Institute, School of Mechanical and Aerospace Engineering Nanyang Technological University, Singapore, March 2019", a reinforcement-learning solution is proposed as a way of automating resolution of air conflicts. Such a solution is intended to ensure that minimum separating distances are maintained. This solution implements an algorithm (called 'deep deterministic policy gradient') that uses a dense artificial neural network to resolve conflicts between two airplanes flying in straight lines in a two-dimensional space, only a single resolution action, which consists of a change in direction with return to a waypoint on the initial path, being possible.

The article "Autonomous air-traffic controller: A Deep Multi-Agent Reinforcement Learning Approach, Marc Brittain, Peng Wei, Department of Aerospace Engineering, Iowa State University, May 2019" describes another reinforcement-learning solution for automating air-conflict resolution, this solution implementing a deep multi-agent reinforcement-learning algorithm employing dense artificial neural networks for the approximation. This solution allows conflicts between any number of aircraft to be resolved. However, the resolution of air conflicts according to this solution is restricted to a two-dimensional space, and the only possible resolution action is a change of speed. Furthermore, the neural network implemented in this solution must be re-trained for each type of scenario and is not generalizable to a new succession of waypoints.

The article "Autonomous Aircraft Sequencing and Separation with Hierarchical Deep Reinforcement Learning, Marc Brittain, Peng Wei, Department of Aerospace Engineering, Iowa State University, 2018" also describes a reinforcement-learning solution for resolving aerial conflicts. This solution allows flight plans to be chosen using two neural networks, one of which is nested inside the other: a first network (the "parent network") chooses the flight plans, and the second network (the "child network") adjusts speeds to keep planes separate. This solution allows separation to be maintained, conflicts to be resolved if separation is not maintained, and travel time to be minimized. However, the resolution of conflicts according to this solution is restricted to a two-dimensional space, and the only possible resolution action is a change of speed. In addition, this solution only works for a very limited number of aircraft, and requires neural networks to be trained for each type of scenario.

Existing solutions for managing air conflicts are therefore limited to a small number of possible configurations in terms of number of airplanes, of air corridors, of airplane categories, of airplane speeds or altitudes, or even of possible actions that may be taken to resolve detected conflicts.

There is therefore a need for an improved system and method for managing air traffic, capable of effectively resolving air conflicts.

SUMMARY OF THE INVENTION

The invention aims to improve the situation. To this end, the invention provides a device for managing air traffic, in an airspace comprising a reference aircraft and at least one other aircraft, the device receiving a three-dimensional representation of the airspace at a time when an air conflict is detected between the reference aircraft and the at least one other aircraft, the device being characterized in that it comprises:
- an airspace-encoding unit configured to determine a reduced-dimension representation of the airspace by applying a recurrent autoencoder to the three-dimensional representation of the airspace at the air-conflict detection time;
- a decision-assisting unit configured to determine a conflict-resolution action to be implemented by the reference aircraft, the decision-assisting unit implementing a deep-reinforcement-learning algorithm to determine the action on the basis of said reduced-dimension representation of the airspace, of information relating to the reference aircraft and/or the at least one other aircraft, and of a geometry corresponding to said air conflict.

According to certain embodiments, said recurrent autoencoder may be trained beforehand using real data from the flight plans of the reference aircraft and of the at least one other aircraft.

According to certain embodiments, the autoencoder may be an LSTM autoencoder, LSTM being the acronym of long short-term memory.

According to certain embodiments, the deep-reinforcement-learning algorithm may be trained beforehand to approximate a reward function for a given representation of a scenario in the airspace at the time when a conflict is detected, said action corresponding to an optimum strategy that maximizes said reward function in the training phase.

According to certain embodiments, the reward function may associate a value with each triplet comprising an air situation at a first given time, an action taken at a given time, and an air situation at a second given time, said value being broken down into a plurality of penalties comprising:
a positive penalty if the action taken at the given time resolved said conflict, or
a negative penalty if the action taken at the given time did not allow said conflict to be resolved or led to at least one other air conflict;
a negative penalty if the action taken at the given time leads to a new path that causes a detour;
a positive penalty if the action taken at the given time leads to a shorter new path;
a negative penalty if the action taken at the given time allows the air conflict to be resolved but the resolution occurs close to the conflict;
a negative penalty that increases with the number of actions taken to resolve the air conflict.

According to certain embodiments, the deep-reinforcement-learning algorithm may be trained beforehand using operational data and scenarios corresponding to all possible maneuvers of the reference aircraft, all possible actions for resolving the air conflict, and all possible categories of conflicting aircraft.

According to certain embodiments, the deep-reinforcement-learning algorithm may use a deep neural network implementing a reinforcement-learning technique.

According to certain embodiments, the deep-reinforcement-learning algorithm may be chosen from algorithms of the family of Q-learning algorithms or from the family of actor-critic algorithms.

According to certain embodiments, at least two aircraft among the reference aircraft and the at least one other aircraft may be of different categories.

According to certain embodiments, the action may be chosen from a group comprising adjusting the speed of the reference aircraft, changing the altitude of the reference aircraft, changing the direction of the reference aircraft with return to the initial path, flying direct to a waypoint, and waiting without taking any action.

Embodiments of the invention further provide a method for managing air traffic, in an airspace comprising a reference aircraft and at least one other aircraft, the method comprising a step of receiving a three-dimensional representation of the airspace at a time when an air conflict is detected between the reference aircraft and the at least one other aircraft, the method being characterized in that it comprises the steps of:
determining a reduced-dimension representation of the airspace by applying a recurrent autoencoder to the three-dimensional representation of the airspace at the air-conflict detection time;
determining a conflict-resolution action to be implemented by the reference aircraft, the action being determined on the basis of the reduced-dimension representation of the airspace, of information relating to the reference aircraft and/or the at least one other aircraft, and of a geometry corresponding to the air conflict, by implementing a deep-reinforcement-learning algorithm to determine said action.

Advantageously, embodiments of the invention allow air conflicts to be resolved in a three-dimensional (3D) airspace, irrespectively of how many aircraft and air corridors are involved, of the conflict geometry (geometries other than straight-line geometries may be addressed), and of the diversity of the categories of the aircraft and of the airlines to which they belong, and a high number of possible actions to be taken to resolve the air conflicts, these actions including adjusting speed, changing altitude, changing direction with return to the initial path, possibly cutting the route, and taking no action (which is an action in itself). The ability to choose the action carried out allows the air conflict to be resolved while taking into account the other surrounding aircraft, so as to avoid new conflicts and to minimize any required detour, this making it possible to decrease fuel consumption.

Advantageously, embodiments of the invention allow decision assistance to be provided with a view to resolving air conflicts, the provided assistance taking into account technical considerations and the preferences of air-traffic controllers and of pilots, so as to favor certain actions (for example avoiding a change in altitude whenever possible).

Advantageously, embodiments of the invention use a deep-reinforcement-learning algorithm to provide decision assistance with a view to resolving mid-term air conflicts.

Advantageously, the reinforcement-learning algorithm according to embodiments of the invention is generalizable to any type of scenario and to conflict geometries that have not previously been encountered, retraining not being required for each type of scenario.

Advantageously, the reinforcement-learning algorithm according to embodiments of the invention implements a recurrent neural network, so as to allow the conflicts between any number of aircraft to be resolved.

Advantageously, the reinforcement-learning algorithm according to embodiments of the invention takes into account three levels of uncertainty in the impact of a possible action for resolving air conflicts.

Advantageously, embodiments of the invention provide decision assistance to air-traffic controllers.

BRIEF DESCRIPTION OF THE DRAWINGS

Other features and advantages of the invention will become apparent from the following description, which is given with reference to the appended drawings, which are given by way of example, and in which, respectively.

DETAILED DESCRIPTION

Embodiments of the invention provide a device and method for managing an air conflict between a reference aircraft and at least one other aircraft (also referred to as 'at least one second aircraft') on the basis of a three-dimensional representation of the airspace at the time when the air conflict is detected.

Embodiments of the invention may be used in air-traffic control systems for providing decision assistance to air-traffic controllers, in order to resolve air conflicts, prevent collisions between aircraft, and to manage the flow of air traffic.

According to embodiments of the invention, an aircraft may be any type of aircraft, such as an airplane, a helicopter, a hot-air balloon, or a drone.

Such as used here, a flight plan of an aircraft is a sequence of waypoints in four-dimensional space comprising a latitude, a longitude, an altitude, and a time value (or 'estimated time of overflight'). The waypoints represent the path to be followed by the aircraft at the times indicated by the time values.

Such as used here, a scenario represents a set of flight plans with the identifiers and the categories of at least one aircraft.

According to certain embodiments, two aircraft among the reference aircraft and the at least one other aircraft may be of different categories.

According to certain embodiments in which the reference aircraft and the at least one other aircraft are airplanes, the reference aircraft and at least one other aircraft may belong to different airlines.

According to certain embodiments, the reference aircraft may be randomly selected beforehand.

Figure 1:
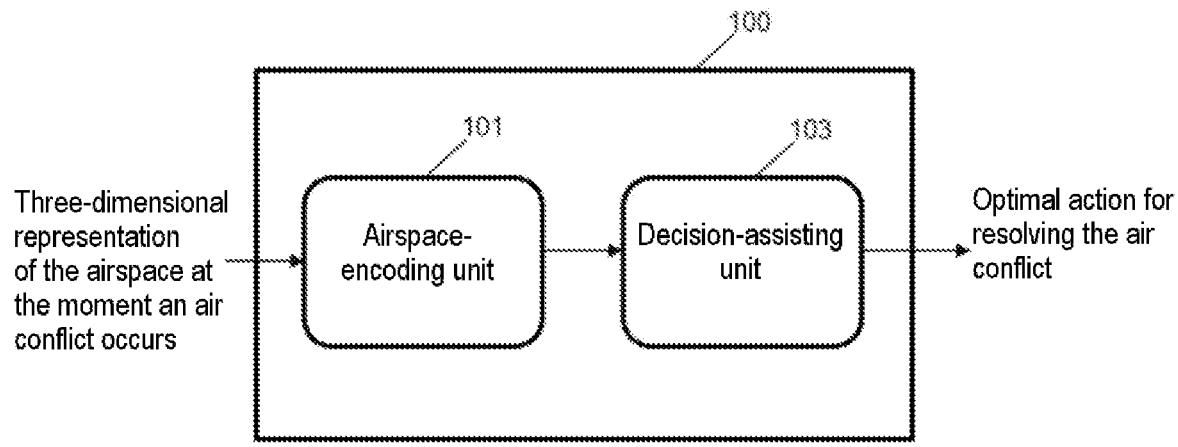
FIG. 1 is a diagram showing a device for managing air conflicts, according to certain embodiments of the invention.

With reference to FIG. 1, embodiments of the invention provide a device 100 for managing an air conflict between a reference aircraft and at least one other aircraft on the basis of a three-dimensional representation of the airspace at the time when the air conflict is detected.

According to certain embodiments, the device 100 may comprise an airspace-encoding unit 101 configured to determine a reduced-dimension representation of the airspace by applying a recurrent autoencoder to the three-dimensional representation of the airspace at the air-conflict detection time, the airspace encoded corresponding to the reference aircraft and the at least one other aircraft involved in the air conflict. The recurrent autoencoder is an artificial neural network that is used to learn a representation (or encoded form) of a set of data, with the aim of decreasing the dimension of this set.

According to certain embodiments, the recurrent autoencoder may be trained beforehand using real data from the flight plans of the reference aircraft and of the at least one other aircraft, independently of the resolution of the air conflict. This training phase may be performed off-line, using a back-propagation variant such as the conjugate gradient method or the gradient algorithm. The recurrent aspect of the autoencoder advantageously allows a variable number of aircraft to be managed and the architecture of the neural network to be made independent of the number of aircraft simultaneously present in the airspace.

According to certain embodiments, the autoencoder may be an LSTM autoencoder, LSTM being the acronym of long short-term memory.

According to certain embodiments, the device 100 may further comprise a decision-assisting unit 103 configured to provide an action to be implemented by the reference aircraft to resolve the air conflict, the decision-assisting unit 103 applying a deep-reinforcement-learning algorithm to determine the action on the basis of the reduced-dimension representation of the airspace delivered by the autoencoder, of information relating to the reference aircraft and/or the at least one other aircraft, and of the geometry corresponding to the air conflict.

According to certain embodiments, the information relating to the reference aircraft and/or the at least one other aircraft may comprise the vertical distance, horizontal distance, and azimuth between the reference aircraft and the at least one other aircraft. The information may further comprise distances and angles between the reference aircraft and at least one aircraft not included in the air conflict, the category of the reference aircraft and the position of the last waypoints.

According to certain embodiments, the action may be chosen from a group comprising adjusting the speed of the reference aircraft, changing the altitude of the reference aircraft, changing the direction of the reference aircraft with return to the initial path, flying direct to a waypoint, and waiting without taking any action.

According to embodiments of the invention, the decision-assisting unit 103 is based on deep-reinforcement-learning techniques that combine reinforcement learning with artificial neural networks to determine, on the basis of the encoded form of the airspace at the moment of the air conflict, the optimum action to be implemented by the reference aircraft to resolve the air conflict given a set of constraints. According to embodiments of the invention, the set of constraints comprises:

management of the three-dimensional airspace;

management of all the types of actions that can be taken to resolve air conflicts;

management of a variable number of aircraft of diverse categories and belonging to various companies;

resolution of the air conflict with account taken for surrounding aircraft (so as to avoid creating new air conflicts), and effective resolution of the air conflict with minimization of the detour following an action, and consideration of conflict scenarios and geometries not previously encountered.

To an autonomous agent, the reinforcement learning consists in learning, on the basis of experiments, the actions to take to optimize, over time, a quantitative reward function.

The autonomous agent is immersed in an environment and makes its decisions depending on its current state. In return, the environment provides the autonomous agent with a reward, which is a numerical value that may be positive, negative, or zero, positive rewards emphasizing a desired action, negative rewards emphasizing an action from which the agent must refrain, and rewards of zero value indicating that the action is neutral. The environment may change as the agent takes actions, actions being the way in which the agent interacts with and changes its environment, and therefore transfers between states.

The autonomous agent seeks, through iterated experiments, an optimum decision-making behavior (also called a 'strategy' or 'policy') allowing rewards to be maximized over time.

The reinforcement-learning model is thus based on:

a set S of states of the agent in the environment;

a set A of actions that the agent is able to perform, and a set R of scalar values (also called rewards or reward functions) that the agent may obtain from the environment. Each reward function reflects the behavior that the agent much adopt.

In each time increment t of the reinforcement-learning algorithm, the agent perceives its state $s_t \in S$ (also called the situation at the given time t) and the set $A(s_t)$ of possible actions. The agent chooses an action $a \in A(s_t)$ (also called the action taken at the given instant t) and receives from the environment a new state $s_{t+1}$ (also called the situation at the given time t+1) and a reward $R_{t+1}$. The decision as to the action to choose by the agent is taken by a policy $\pi: S \rightarrow A$ that is a function that associates, in a manner conditional on a state, a selection probability with each action in this state. The purpose of the agent is to maximize the overall reward that it receives from the environment during an episode, an episode comprising all of the states of the agent between an initial state and an end state. The value designated Q-value and denoted Q(s, a) measures the overall reward expected if the agent is in the state S ∈S and performs the action a, and then continues to interact with its environment until the end of the current episode in accordance with a policy π.

According to embodiments of the invention:
each aircraft is an autonomous agent that must learn to resolve conflicts in the airspace;
the environment of the agent is a representation of the airspace described by a scenario, and
the actions taken by an aircraft comprise all possible air-traffic control actions including changing direction, changing altitude, changing speed, flying direct to a waypoint, and changing direction with return to the initial path.

According to certain embodiments, the agent may not observe the entirety of the environment, but only a few variables that allow it to move through the environment effectively. These variables may comprise the velocity, the position and the altitude of the agent and of all of the other aircraft present, and information on the air conflict to be resolved and the positions of the waypoints to which the agent is able to 'fly direct'.

According to certain embodiments, the deep-reinforcement-learning algorithm may be trained beforehand to approximate a reward function for a given representation of the scenario in the airspace at the time of detection of a conflict, such that the (optimum) action to be implemented by the reference aircraft corresponds to the learned optimum strategy allowing the reward function to be maximized. Training the reinforcement-learning algorithm thus allows future cumulative sums (or overall rewards) that the agent may obtain for a given action and situation (or scenario) to be determined. Following training and convergence of the reinforcement-learning algorithm, the action that yields the maximum reward function may be delivered to the reference aircraft in order to allow it to follow the optimum strategy for resolving the air conflict.

According to certain embodiments, the reward function may be modeled beforehand so that the optimum strategy for maximizing rewards corresponds to the set of constraints that was defined above. According to certain embodiments, the reward function may be modeled so as to associate a value with each triplet comprising an air situation at a first given time t, an action taken at a given time t, and an air situation at a second given time t+1, the value reflecting the attractiveness of the triplet and being broken down into a plurality of penalties comprising:
a positive penalty if the action a taken at the given time t resolved the conflict,
a negative penalty if the action a taken at the given time t did not allow the conflict to be resolved or led to at least one other air conflict,
a negative penalty if the action a taken at the given time t leads to a new path that causes a detour,
a positive penalty if the action a taken at the given time t leads to a shorter new path,
a negative penalty if the action a taken at the given time t allows the air conflict to be resolved but the resolution occurs close to the conflict, and
a negative penalty that increases with the number of actions taken to resolve the air conflict.

According to certain embodiments, the deep-reinforcement-learning algorithm may be trained beforehand using operational data and scenarios corresponding to all possible maneuvers of the reference aircraft, all possible actions for resolving an air conflict, and all possible categories of conflicting aircraft.

According to certain embodiments, the deep-reinforcement-learning algorithm may be trained beforehand using realistic scenarios created automatically on the basis of operational data, the data being augmented for deep learning, for example by varying the categories of the aircraft and/or by adding delays to some aircraft so as to allow air conflicts to be modified and added.

According to certain embodiments, the deep-reinforcement-learning algorithm may be trained beforehand using data generated by conflict-detecting devices and/or path-modifying devices (not shown in FIG. 1).

According to certain embodiments, the deep-reinforcement-learning algorithm may be a deep neural network implementing a reinforcement-learning technique.

According to certain embodiments, the deep-reinforcement-learning algorithm may be chosen from algorithms of the family of Q-learning algorithms or from the family of actor-critic algorithms.

Figure 2:
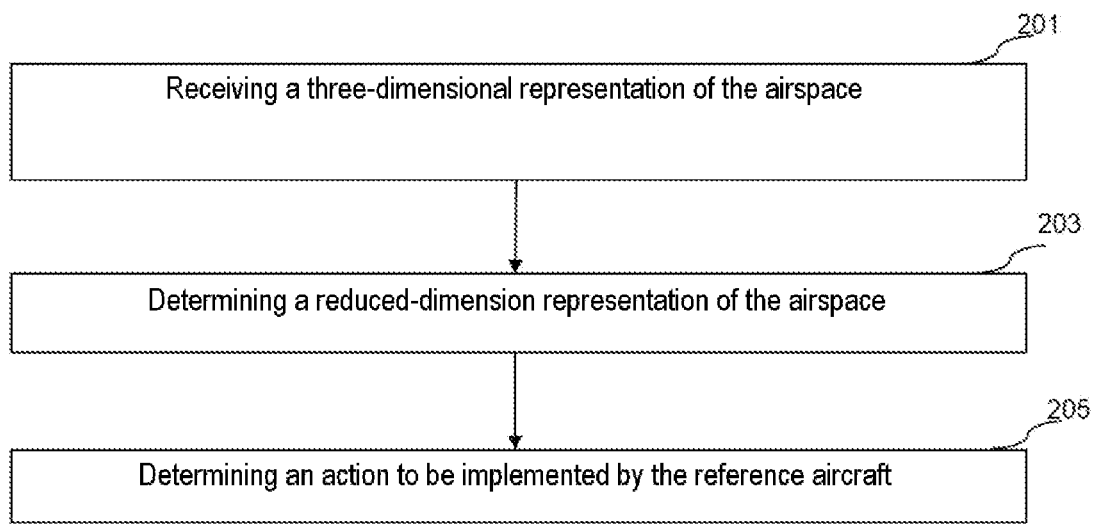
FIG. 2 is a flowchart showing a method for managing air conflicts, according to certain embodiments of the invention.

With reference to FIG. 2, embodiments of the invention further provide a method for managing an air conflict between a reference aircraft and at least one other aircraft on the basis of a three-dimensional representation of the airspace at the time when the air conflict is detected.

In step 201, a three-dimensional representation of the airspace at the time of the air conflict may be received.

In step 203, a reduced-dimension representation of the airspace may be determined by applying a recurrent autoencoder to the three-dimensional representation of the airspace at the air-conflict detection time, the airspace encoded corresponding to the reference aircraft and the at least one other aircraft involved in the air conflict.

According to certain embodiments, step 203 may comprise a sub-step performed off-line to train the recurrent autoencoder using real data from the flight plans of the reference aircraft and of the at least one other aircraft, independently of the resolution of the air conflict.

According to certain embodiments, the recurrent autoencoder may be trained using a back-propagation variant, such as the conjugate gradient method or the gradient algorithm.

According to certain embodiments, the recurrent autoencoder may be an LSTM autoencoder.

In step 205, an action to be implemented by the reference aircraft may be determined on the basis of the reduced-dimension representation of the airspace, of information relating to the reference aircraft and/or the at least one other aircraft, and of the geometry of the air conflict, by applying a deep-reinforcement-learning algorithm.

According to certain embodiments, the information relating to the reference aircraft and/or the at least one other aircraft may comprise the vertical distance, horizontal distance, and azimuth between the reference aircraft and the at least one other aircraft. The information may further comprise distances and angles between the reference aircraft and at least one aircraft not included in the air conflict, the category of the reference aircraft and the position of the last waypoints.

According to certain embodiments, the action to be implemented by the reference aircraft may be chosen from a group comprising adjusting the speed of the reference aircraft, changing the altitude of the reference aircraft, changing the direction of the reference aircraft with return to the initial path, flying direct to a waypoint, and waiting without taking any action.

According to certain embodiments, the deep-reinforcement-learning algorithm may be designed to determine the optimum action among all the possible actions that may be taken to resolve air conflicts while meeting a set of constraints or requirements comprising:
management of the three-dimensional airspace;
management of all the types of actions that can be taken to resolve air conflicts;
management of a variable number of aircraft of diverse categories and belonging to various companies;
resolution of the air conflict with account taken for surrounding aircraft (so as to avoid creating new air conflicts), and
effective resolution of the air conflict with minimization of the detour following an action, and consideration of conflict scenarios and geometries not previously encountered.

According to the embodiments of the invention, the model of the deep-reinforcement-learning algorithm may be defined by:
an autonomous agent corresponding to an aircraft, the autonomous agent having to learn, based on experiment, the actions to take to resolve conflicts in the airspace so as to optimize a reward function over time;
the environment of the agent corresponds to a representation of the airspace described by a scenario, the agent being immersed in this environment and taking actions allowing it to interact with and change its environment and to change states; the actions taken by an agent comprise all possible air-traffic control actions that an aircraft is able to take to resolve an air conflict, these including changing direction, changing altitude, changing speed, flying direct to a waypoint, and changing direction with return to the initial path.

According to certain embodiments, the agent may not observe the entirety of the environment, but only a few variables that allow it to move through the environment effectively. These variables may comprise the velocity, the position and the altitude of the agent and of all of the other aircraft present, and information on the air conflict to be resolved and the positions of the waypoints to which the agent is able to 'fly direct'.

In each time increment t of the reinforcement-learning algorithm, the agent perceives its state $s_t \in S$ at the given time t and the set $A(s_t)$ of possible actions. The agent chooses an action $a \in A(s_t)$ and receives, from the environment, a new state $s_{t+1}$ corresponding to the situation at the given time t+1 and a reward $R_{t+1}$. The decision as to the action to choose by the agent is taken by a policy $\pi: S \rightarrow A$ that is a function that associates, in a manner conditional on a state, a selection probability with each action in this state. The purpose of the agent is to maximize the overall reward that it receives from the environment during an episode, an episode comprising all of the states of the agent between an initial state and an end state. The value designated Q-value and denoted Q(s, a) measures the overall reward expected if the agent is in the state $s \in S$ and performs the action a, and then continues to interact with its environment until the end of the current episode in accordance with a policy $\pi$.

According to certain embodiments, the deep-reinforcement-learning algorithm may be trained beforehand to approximate a reward function for a given representation of the scenario in the airspace at the moment a conflict occurs, such that the action to be implemented by the reference aircraft corresponds to the learned optimum strategy allowing the reward function to be maximized. Training the reinforcement-learning algorithm thus allows future cumulative sums (or overall rewards) that the agent may obtain for a given action and situation (or scenario) to be determined. Following training and convergence of the reinforcement learning algorithm, the action that yields the maximum reward function for the given current situation at the time of the conflict may be selected; it represents the action that corresponds to the optimum strategy for resolving the air conflict.

According to certain embodiments, the reward function may be modeled beforehand so that the optimum strategy for maximizing rewards corresponds to the set of constraints that was defined above. According to certain embodiments, the reward function may be modeled so as to associate a value with each triplet comprising an air situation at a first given time t, an action a taken at a given time t, and an air situation at a second given time t+1, the value reflecting the attractiveness of the triplet and being broken down into a plurality of penalties comprising:
a positive penalty if the action a taken at the given moment t resolved the conflict;
a negative penalty if the action a taken at the given time t did not allow the conflict to be resolved or led to at least one other air conflict;
a negative penalty if the action a taken at the given time t leads to a new path that causes a detour;
a positive penalty if the action a taken at the given time t leads to a shorter new path;
a negative penalty if the action a taken at the given time t allows the air conflict to be resolved but the resolution occurs close to the conflict, and
a negative penalty that increases with the number of actions taken to resolve the air conflict.

According to certain embodiments, the deep-reinforcement-learning algorithm may be trained beforehand using operational data and scenarios corresponding to all possible maneuvers of the reference aircraft, all possible actions for resolving an air conflict, and all possible categories of conflicting aircraft.

According to certain embodiments, the deep-reinforcement-learning algorithm may be trained beforehand using realistic scenarios created automatically on the basis of operational data, the data being augmented for deep learning, for example by varying the categories of the aircraft and/or by adding delays to some aircraft so as to allow air conflicts to be modified and added.

According to certain embodiments, the deep-reinforcement-learning algorithm may be a deep neural network implementing a reinforcement-learning technique.

According to certain embodiments, the deep-reinforcement-learning algorithm may be chosen from algorithms of the family of Q-learning algorithms or from the family of actor-critic algorithms.

The invention further provides a computer program product for managing an air conflict between a reference aircraft and at least one other aircraft on the basis of a three-dimensional representation of the airspace at the time when the air conflict is detected, the computer program product comprising computer-program code instructions that, when they are executed by one or more processors, cause the one or more processors to:
determine a reduced-dimension representation of the airspace by applying a recurrent autoencoder to the three-dimensional representation of the airspace at the air-conflict detection time;
determine an action to be implemented by the reference aircraft on the basis of the reduced-dimension representation of the airspace, of information relating to the reference aircraft and/or the at least one other aircraft, and of the geometry of the air conflict, by applying a deep-reinforcement-learning algorithm.

In general, the routines executed to implement the embodiments of the invention, whether they are implemented in the context of an operating system or a specific application, a component, a program, an object, a module or a sequence of instructions, or even a subset thereof, may be referred to as 'computer program code' or just 'program code'. The program code typically comprises computer-readable instructions which reside at various times in various memory and storage devices in a computer and which, when they are read and executed by one or more processors in a computer, cause the computer to perform the operations required to execute the operations and/or the elements specific to the various aspects of the embodiments of the invention. The computer-readable instructions of a program for performing the operations of the embodiments of the invention may be, for example, the assembly language, or else a source code or an object code written in combination with one or more programming languages.

The invention is not limited to the embodiments described above by way of non-limiting example. It encompasses any variant embodiment envisionable by those skilled in the art.

The invention claimed is:

1. A device for managing air traffic, in an airspace comprising a reference aircraft and at least one other aircraft, the device using a three-dimensional representation of the airspace at a time when an air conflict is detected between the reference aircraft and said at least one other aircraft, the device comprising:
an airspace-encoding unit configured to determine a reduced-dimension representation of the airspace by applying a recurrent autoencoder to said three-dimensional representation of the airspace at said air-conflict detection time;
a decision-assisting unit configured to determine a conflict-resolution action to be implemented by said reference aircraft, said decision-assisting unit implementing a deep-reinforcement-learning algorithm to determine said action on the basis of said reduced-dimension representation of the airspace, of information relating to said reference aircraft and/or said at least one other aircraft, and of a geometry corresponding to said air conflict,
and in that said deep-reinforcement-learning algorithm is trained beforehand to approximate a reward function for a given representation of a scenario in the airspace at the time when a conflict is detected, said action corresponding to an optimum strategy that maximizes said reward function in the training phase.

2. The device as claimed in claim 1, wherein said recurrent autoencoder is trained beforehand using real data from the flight plans of the reference aircraft and of the at least one other aircraft.

3. The device as claimed in claim 1, wherein said autoencoder is an LSTM autoencoder, LSTM being the acronym of long short-term memory.

4. The device as claimed in claim 1, wherein said reward function associates a value with each triplet comprising an air situation at a first given time, an action taken at a given time, and an air situation at a second given time, said value being broken down into a plurality of penalties comprising:
a positive penalty if the action taken at the given time resolved said conflict, or a negative penalty if the action taken at the given time did not allow said conflict to be resolved or led to at least one other air conflict;
a negative penalty if the action taken at the given time leads to a new path that causes a detour;
a positive penalty if the action taken at the given time leads to a shorter new path;
a negative penalty if the action taken at the given time allows said air conflict to be resolved but the resolution occurs close to the conflict;
a negative penalty that increases with the number of actions taken in succession to resolve said air conflict.

5. The device as claimed in claim 1, wherein said deep-reinforcement-learning algorithm is trained beforehand using operational data and scenarios corresponding to all possible maneuvers of the reference aircraft, all possible actions for resolving said air conflict, and all possible categories of conflicting aircraft.

6. The device as claimed in claim 1, wherein said deep-reinforcement-learning algorithm uses a deep neural network implementing a reinforcement-learning technique.

7. The device as claimed in claim 6, wherein said deep-reinforcement-learning algorithm is chosen from algorithms of the family of Q-learning algorithms or from the family of actor-critic algorithms.

8. The device as claimed in claim 1, wherein at least two aircraft among said reference aircraft and said at least one other aircraft are of different categories.

9. The device as claimed in claim 1, wherein said action is chosen from a group comprising adjusting the speed of said reference aircraft, changing the altitude of said reference aircraft, changing the direction of said reference aircraft with return to the initial path, flying direct to a waypoint, and waiting without taking any action.

10. A method for managing air traffic, in an airspace comprising a reference aircraft and at least one other aircraft, on the basis of a three-dimensional representation of the airspace at a time when an air conflict is detected between the reference aircraft and said at least one other aircraft, the method comprising the steps of:
determining a reduced-dimension representation of the airspace by applying a recurrent autoencoder to said three-dimensional representation of the airspace at said air-conflict detection time;
determining a conflict-resolution action to be implemented by said reference aircraft, said action being determined on the basis of said reduced-dimension representation of the airspace, of information relating to said reference aircraft and/or said at least one other aircraft, and of a geometry corresponding to said air conflict, by implementing a deep-reinforcement-learning algorithm to determine said action,
and in that said deep-reinforcement-learning algorithm is trained beforehand, in a training phase, to approximate a reward function for a given representation of a scenario in the airspace at the time when a conflict is detected, said determined conflict-resolution action corresponding to an optimum strategy that maximizes said reward function in said training phase.

* * * * *